United States Patent
Yang et al.

(10) Patent No.: US 12,395,301 B2
(45) Date of Patent: Aug. 19, 2025

(54) BEAM INFORMATION DETERMINING METHOD, TERMINAL, AND NETWORK DEVICE

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 377 days.

(21) Appl. No.: 17/866,812

(22) Filed: Jul. 18, 2022

(65) Prior Publication Data

US 2022/0352969 A1  Nov. 3, 2022

Related U.S. Application Data

(63) Continuation of application No. PCT/CN2021/071719, filed on Jan. 14, 2021.

(30) Foreign Application Priority Data

Jan. 21, 2020  (CN) .......................... 202010072792.9

(51) Int. Cl.
*H04B 7/08* (2006.01)
*H04W 72/23* (2023.01)

(52) U.S. Cl.
CPC .......... *H04B 7/0851* (2013.01); *H04W 72/23* (2023.01)

(58) Field of Classification Search
CPC . H04W 72/04; H04W 72/044; H04W 72/046; H04W 72/20; H04W 72/23; H04W 72/231; H04W 72/232; H04W 16/28; H04W 24/10; H04W 74/006; H04W 88/02; H04B 7/0695; H04B 7/06952;
(Continued)

(56) References Cited

U.S. PATENT DOCUMENTS

| 9,900,891 B1 | 2/2018 | Islam et al. |
| 2019/0289588 A1 | 9/2019 | Akkarakaran et al. |

(Continued)

FOREIGN PATENT DOCUMENTS

| CN | 110535597 A | 12/2019 |
| WO | 2018118409 A1 | 6/2018 |

(Continued)

OTHER PUBLICATIONS

International Search Report issued in corresponding International Application No. PCT/CN2021/071719, mailed Apr. 6, 2021, 4 pages.
(Continued)

*Primary Examiner* — Peter Chen
(74) *Attorney, Agent, or Firm* — IPX PLLC

(57) ABSTRACT

A beam information determining method, a terminal, and a network device are provided. The beam information determining method is executed by the terminal. The method includes determining at least two pieces of default beam information. The method further includes determining, according to the default beam information, beam information of a channel or a reference signal included in a set corresponding to the default beam information. The set includes at least one channel and/or at least one reference signal.

18 Claims, 3 Drawing Sheets

(58) Field of Classification Search
CPC .... H04B 7/088; H04B 7/0617; H04B 7/0408; H04B 7/0851
See application file for complete search history.

(56) References Cited

U.S. PATENT DOCUMENTS

2020/0029292 A1* 1/2020 Zou ................. H04W 76/27
2021/0153217 A1* 5/2021 Zhou ................ H04B 7/0695
2021/0328652 A1* 10/2021 Shao ............... H04W 72/0453

FOREIGN PATENT DOCUMENTS

WO    2019183125 A1    9/2019
WO    2019199084 A1    10/2019

OTHER PUBLICATIONS

Asustek, "Enhancements on Multiple TRP or Panel Transmission", 3GPP TSG RAN WG1 #98bis R1-1911217, Oct. 2019.
Extended European Search Report issued in related European Application No. 21744464.5, mailed Jan. 8, 2024, 10 pages.
First Office Action issued in related Chinese Application No. 202010072792.9, mailed Aug. 25, 2022, 10 pages.

* cited by examiner

BEAM INFORMATION DETERMINING METHOD, TERMINAL, AND NETWORK DEVICE

CROSS-REFERENCE TO RELATED APPLICATIONS

This application is a continuation of International Application No. PCT/CN2021/071719, filed on Jan. 14, 2021, which claims priority to and benefits of Chinese Patent Application No. 202010072792.9, filed with the China National Intellectual Property Administration on Jan. 21, 2020. The entire contents of each of the above-referenced applications are expressly incorporated herein by reference.

TECHNICAL FIELD

The present disclosure relates to the field of communications technologies, and in particular, to a beam information determining method.

BACKGROUND

Currently, beam information of each channel or reference signal is substantially independently configured or indicated. Because there are a relatively large quantity of channels or reference signals, a relatively large quantity of signaling overheads are required to implement beam indication.

Performance objectives of the channels or reference signals are different. For example, a control channel needs to ensure coverage and reliability, and a data channel needs to pursue a high transmission rate. Therefore, use of a wide beam on the control channel and use of a narrow beam on the data channel can better conform to respective performance objectives of the channels.

SUMMARY

According to a first aspect, embodiments of the present disclosure provide a beam information determining method, applicable to a terminal and including:

determining at least two pieces of default beam information; and determining, according to the default beam information, beam information of a channel and/or a reference signal included in a set corresponding to the default beam information, where the set includes at least one channel and/or at least one reference signal.

According to a second aspect, the embodiments of the present disclosure further provide a beam information determining method, applicable to a first Transmitting and Receiving Point (TRP) and including:

determining at least two pieces of default beam information; and determining, according to the default beam information, beam information of a channel and/or a reference signal included in a set corresponding to the default beam information, where the set includes at least one channel and/or at least one reference signal.

According to a third aspect, the embodiments of the present disclosure further provide a terminal, including:

a first determining module, configured to determine at least two pieces of default beam information; and a second determining module, configured to determine, according to the default beam information, beam information of a channel and/or a reference signal included in a set corresponding to the default beam information, where the set includes at least one channel and/or at least one reference signal.

According to a fourth aspect, the embodiments of the present disclosure further provide a terminal, including a memory, a processor, and a computer program stored in the memory and executable by the processor. The computer program, when executed by the processor, implements steps of the foregoing beam information determining method applicable to a terminal.

According to a fifth aspect, the embodiments of the present disclosure further provide a network device. The network device is a first TRP and includes:

a third determining module, configured to determine at least two pieces of default beam information; and a fourth determining module, configured to determine, according to the default beam information, beam information of a channel and/or a reference signal included in a set corresponding to the default beam information, where the set includes at least one channel and/or at least one reference signal.

According to a sixth aspect, the embodiments of the present disclosure further provide a network device. The network device is a first TRP and includes a memory, a processor, and a computer program stored in the memory and executable by the processor. The computer program, when executed by the processor, implements steps of the foregoing beam information determining method applicable to a first TRP.

According to a seventh aspect, the embodiments of the present disclosure further provide a computer-readable storage medium, storing a computer program. The computer program, when executed by a processor, implements steps of the foregoing beam information determining method.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art may still derive other drawings from these accompanying drawings.

DETAILED DESCRIPTION

Figure 1:
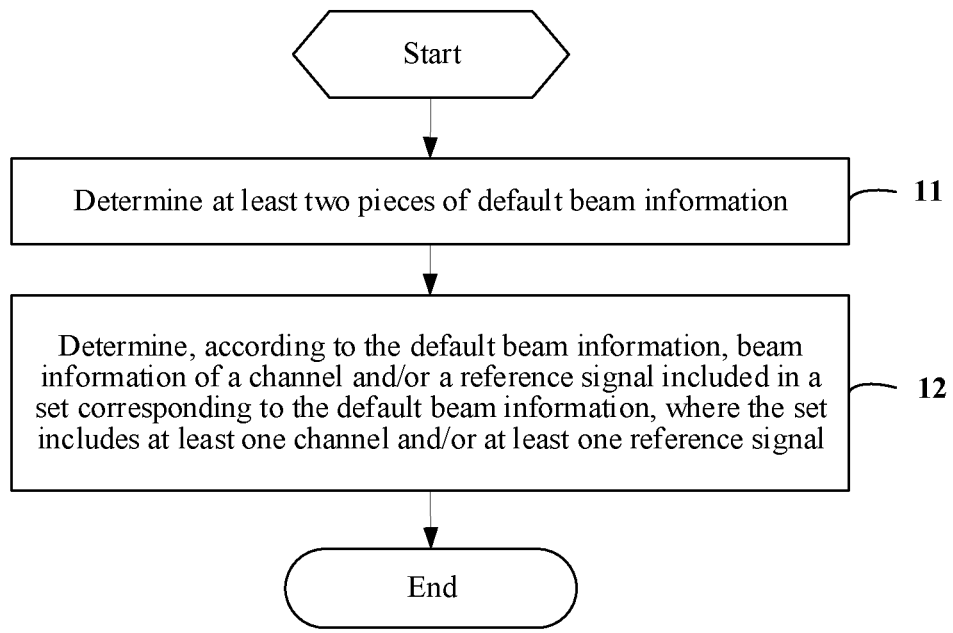
FIG. 1 is a first schematic flowchart of a beam information determining method according to an embodiment of the present disclosure.

The following describes in detail exemplary embodiments of this application with reference to the accompanying drawings. Although the accompanying drawings show the exemplary embodiments of this application, it should be understood that this application may be implemented in various manners and is not limited by the embodiments described herein. Rather, these embodiments are provided, so that this application is more thoroughly understood and the scope of this application is conveyed to a person skilled in the art.

The specification and claims of this application, and terms "first" and "second" are used to distinguish similar objects, but are unnecessarily used to describe a specific sequence or order. It should be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Before the embodiments of the present disclosure are described, some concepts to be used in the following description are explained first.

About Multi-Antenna

All wireless access technology standards such as Long Term Evolution (LTE)/Long Term Evolution-Advanced (LTE-A) are constructed based on Multiple Input Multiple Output (MIMO)+Orthogonal Frequency Division Multiplexing (OFDM) technologies. In the MIMO technology, a spatial degree of freedom that a multi-antenna system can obtain is used for improving a peak rate and system spectrum utilization.

During the development of standardization, dimensions of the MIMO technology continuously extend. In LTE Rel-8, at most four layers of MIMO transmission can be supported. Based on the enhanced Multi-User MIMO (MU-MIMO) technology in Rel-9, at most four downlink data layers can be supported in MU-MIMO transmission in Transmission Mode (TM)-8. In Rel-10, the transmission capability of Single-User MIMO (SU-MIMO) is extended to at most eight data layers.

The industry is further pushing the MIMO technology forward in a three-dimensional and massive direction. Currently, the Third Generation Partnership Projects (3GPPs) have completed the 3D channel modeling research project, and are carrying out research and standardization work of enhanced Full Dimension Multiple Input Multiple Output (eFD-MIMO) and New Radio MIMO (NR MIMO). In a future 5G mobile communication system, a more massive MIMO technology with more antenna ports will be introduced.

Use of a massive antenna array in the massive MIMO technology can greatly improve system band utilization and support a larger quantity of access users. Therefore, all major research organizations consider the Massive MIMO technology as one of the most potential physical layer technologies in a next-generation mobile communication system.

If a fully-digital array is used in the Massive MIMO technology, maximized spatial resolution and optimal MU-MIMO performance may be achieved. However, this structure requires a large quantity of Analog-to-Digital (AD)/Digital-to-Analog (DA) conversion devices and a large quantity of complete radio frequency-baseband processing channels. As a result, either of device costs and baseband processing complexity is a huge burden.

To avoid the foregoing implementation costs and device complexity, a digital-analog hybrid beamforming technology emerges as the times require. That is, based on conventional digital field beamforming, one level of beamforming is added to a radio frequency signal at a front end close to an antenna system. Analog beamforming can implement relatively rough matching between a sent signal and a channel in a relatively simple manner. The quantity of dimensions of an equivalent channel formed after analog beamforming is less than the actual quantity of antennas, and therefore the quantity of AD/DA conversion devices and the quantity of digital channels required afterward, and corresponding baseband processing complexity can be all greatly reduced. Some residual interference of the analog beamforming can be processed once again in the digital field, thereby ensuring quality of MU-MIMO transmission. Compared with the fully-digital beamforming, the digital-analog hybrid beamforming is a compromise between performance and complexity, and has a relatively high practical prospect in a system that has a high frequency band and a large bandwidth or a very large quantity of antennas.

About a High Frequency Band

In research on a next-generation communication system following 4G, an operating frequency band supported by the system is increased to 6 GHz or above, and reaches about 100 GHz at most. The high frequency band has relatively rich idle frequency resources, and can provide a larger throughput for data transmission. By now, the 3GPP has completed the high-frequency channel modeling work. A high-frequency signal has a short wavelength. Compared with a low frequency band, more antenna array elements can be arranged on a panel in the same size, and the beamforming technology is used for forming beams with stronger directivity and narrower lobes. Therefore, a combination of massive antennas and high-frequency communication is also one of future trends.

About Beam Measurement and Report

In the analog beamforming, transmission is performed in a full bandwidth, and array elements in each polarization direction on a panel of each high-frequency antenna array can send analog beams only in a time-division multiplexing manner. A beamforming weight of the analog beam is achieved by adjusting a parameter of a device such as a radio frequency front-end phase shifter.

In the current academic and industrial fields, analog beamforming vectors are usually trained through polling. To be specific, array elements in each polarization direction of each antenna panel sequentially send training signals (that is, candidate beamforming vectors) within respective appointed time periods via time-division multiplexing. Then, a terminal feeds back a beam report after measurement, so that the network side uses the training signals to transmit analog beams during a next transmission service. Content of the beam report usually includes identifiers of a plurality of optimal transmission beams and a measured received power of each transmission beam.

During beam measurement, a network configures a Reference Signal resource set (RS resource set), which includes at least one reference signal resource such as a Synchronization Signal and PBCH block (SSB) resource or a Channel State Information Reference Signal (CSI-RS) resource. The terminal measures a Layer 1 reference signal received power (L1-RSRP)/L1 Signal to Interference plus Noise Ratio (L1-SINR) of each RS resource, and reports at least one optimal measurement result to the network, where the report content includes an SSB resource indicator) SSBRI) or a CSI-RS Resource Indicator (CRI), and the L1-RSRP/L1-SINR. The report content reflects at least one optimal beam and quality thereof, for the network to determine a beam used for sending a channel or signal to User Equipment (UE).

About a Beam Indication Mechanism

After beam measurement and beam report are performed, the network may perform beam indication on downlink and uplink channels or reference signals, where the beam indication is used for establishing a beam link between the network and the terminal, to implement channel or reference signal transmission.

For beam indication of a Physical Downlink Control CHannel (PDCCH), the network configures K Transmission Configuration Indication (TCI) states for each COntrol REsource SET (CORESET) by using Radio Resource Control (RRC) signaling. When K>1, a Media Access Control (MAC) Control Element (CE) indicates or activates one TCI state; and when K=1, no additional MAC CE command is required. When listening to the PDCCH, the UE uses the same Quasi-Colocation (QCL) for all search space in the CORESET, that is, listens to the PDCCH in the same TCI state. Ports of a reference signal (for example, a periodic CSI-RS resource, a semi-persistent CSI-RS resource, or a Synchronization Signal block (SS block)) in the TCI state and a DeModulation Reference Signal (DMRS) of a User Equipment-specific Physical Downlink Control CHannel (UE-specific PDCCH) are spatial QCL. The UE may learn, according to the TCI state, a received beam which is used for receiving the PDCCH.

For beam indication of a Physical Downlink Shared CHannel (PDSCH), the network configures M TCI states through RRC signaling, then activates $2^N$ TCI states by using a MAC CE command, and then gives a notification of a TCI state through an N-bit TCI field N-bit TCI field of Downlink Control Information (DCI). Ports of a reference signal in the TCI state and a DMRS of a to-be-scheduled PDSCH are QCL. The UE may learn, according to the TCI state, a received beam which is used for receiving the PDSCH.

For beam indication of the CSI-RS, when the type of the CSI-RS is a periodic CSI-RS, the network configures QCL information for the CSI-RS resource through RRC signaling. When the type of the CSI-RS is a semi-persistent CSI-RS, the network indicates QCL information thereof when activating one CSI-RS resource from a CSI-RS resource set configured by RRC through a MAC CE command. When the type of the CSI-RS is an aperiodic CSI-RS, the network configures QCL for the CSI-RS resource through RRC signaling, and triggers the CSI-RS by using DCI.

For beam indication of a Physical Uplink Control CHannel (PUCCH), the network configures spatial relation information for each PUCCH resource through parameter PUCCH-spatial relation information by using RRC signaling. When a plurality of pieces of spatial relation information configured for the PUCCH resource are included, one of the pieces of spatial relation information is indicated or active by using a MAC-CE. When only one piece of spatial relation information configured for the PUCCH resource is included, no additional MAC CE command is required.

For beam indication of a Physical Uplink Shared CHannel (PUSCH), spatial relation information of the PUSCH indicates that when the DCI borne by the PDCCH schedules the PUSCH, each SRI codepoint of the SRI field in the DCI indicates one SRI, where the SRI is used for indicating spatial relation information of the PUSCH.

For beam indication of an SRS, when the type of the SRS is a periodic SRS, the network configures spatial relation information for an SRS resource through RRC signaling. When the type of the SRS is a semi-persistent SRS, the network activates one from a group of spatial relation information configured by RRC through a MAC CE command. When the type of the SRS is an aperiodic SRS, the network configures spatial relation information for an SRS resource through RRC signaling.

The beam information, the spatial relation information, the TCI state information, the QCL information, and the like may all mean beam information. The downlink beam information may be usually represented by the TCI state information or the QCL information. The uplink beam information may be usually represented by the spatial relation information.

Therefore, an embodiment of the present disclosure provides a beam information determining method, which can resolve the problems in the existing technology that a relatively large quantity of signaling overheads are required to implement beam indication, and requirements for different performance objectives of channels or reference signals need to be differentiated.

As shown in FIG. 1, an embodiment of the present disclosure provides a beam information determining method, applicable to a terminal and including:

Step 11. Determine at least two pieces of default beam (default beam) information.

The at least two pieces of default beam information may be default beam information determined by the terminal, or may be received determined default beam information sent by a network device or default beam information specified in a protocol.

Step 12. Determine, according to the default beam information, beam information of a channel and/or a reference signal included in a set corresponding to the default beam information, where the set includes at least one channel and/or at least one reference signal.

For example, the set herein may be an explicit set, or may point to only at least one channel and/or at least one reference signal or be directly replaced with specific at least one channel and/or at least one reference signal, or the set may be referred to as a target object.

After the default beam information is determined, it is determined that the default beam information is used for each channel and/or reference signal included in the set corresponding to the default information. A manner of determining the beam information may be specified in a protocol or indicated by the network device.

Different default beam information corresponds to different sets, and there are a plurality of cases such as a case that one set may include at least one channel and at least one reference signal, or a case that the set may include at least two channels or at least two reference signals.

The set may be specified in a protocol or configured by the network device; and manners of dividing different sets may include:

First type: control channels (PDCCH, PUCCH, and the like), service channels (PDSCH, PUSCH, and the like), and the like belong to different sets.

Second type: different sets include different source reference signal sources RS of channels and/or reference signals. For example, when TCI state/spatial relation information of channels is initially configured according to RRC, a used source RS is a channel or reference signal, of a first RS resource, which corresponds to a piece of default beam information, and a used source RS is a channel or reference signal, of a second RS resource, which corresponds to another piece of default beam information.

Third type: a same type of channels may be divided into different sets according to different usages. For example, a common PDCCH and a unicast PDCCH belong to different sets, or SRS resources with different high-layer parameter usages in an SRS resource set belong to different sets. Manners of dividing different sets are not merely limited to the foregoing content, and are not specifically limited herein.

In the foregoing embodiment of the present disclosure, at least two pieces of default beam information are determined, and beam information of a channel and/or a reference signal included in a set corresponding to the default beam information is determined according to the default beam information, where the set includes at least one channel and/or at least one reference signal, thereby not only reducing signaling overheads of performing beam indication by each channel and/or reference signal, but also using different default beam information for different sets, to meet requirements for different performance objectives.

For example, step 11 may include:

receiving the at least two pieces of default beam information configured by a TRP.

After the TRP determines the at least two pieces of default beam information, the TRP sends the at least two pieces of default beam information to the terminal, and the terminal uses the at least two pieces of default beam information.

For example, the method may further include:

determining updated default beam information; and determining, according to the updated default beam information, beam information of a channel and/or a reference signal included in the set corresponding to the default beam information.

A manner of determining, the terminal, updated default beam information may include: determining updated default beam information through updated default beam information sent by the network device, or updating, by the terminal, default beam information.

If the default beam information includes first default beam information and second default beam information, the set includes a first set and a second set, the first set corresponds to the first default beam information, and the second set corresponds to the second default beam information, when a MAC CE updates the first default beam information (for example, updates TCI state information of a preset CORESET), the first set determines, according to the updated first default beam information, beam information of a channel and/or a reference signal included in the first set; and when the MAC CE updates a corresponding TCI state in a preset codepoint of a TCI field in DCI, updated second default beam information is determined according to a manner of determining the second default beam information, the second set determines, according to the updated second default beam information, beam information of a channel and/or a reference signal included in the second set.

For example, the method may further include:

determining updated beam information of a first channel and/or a first reference signal included in the set corresponding to the default beam information; and determining, according to the updated beam information of the first channel and/or the first reference signal, beam information of one or more other channels and/or one or more other reference signals included in the set.

A manner of determining updated beam information of a first channel and/or a first reference signal may include: determining updated beam information through updated beam information sent by the network device, or updating, by the terminal, beam information.

If the beam information of the first channel and/or the first reference signal in the first set is updated, beam information of one or more other channels and/or one or more other reference signals in the first set is correspondingly updated. The first channel and/or the first reference signal may be a channel and/or a reference signal other than a default channel and/or a default reference signal corresponding to the first default beam information in the first set. Update manners of other sets are similar to that of the first set, and are not described in detail herein.

For example, before step 12, the method may further include:

receiving first signaling, where the first signaling is used for instructing the terminal to use the default beam information;

or determining that the channel and/or the reference signal included in the set corresponding to the default beam information is not configured with beam information.

To cause the network device to correspond to the terminal consistently, when the network device sends the first signaling (for example, starting signaling), and the terminal receives the first signaling (for example, the network starts a mechanism of at least two default beams through RRC signaling), the terminal starts the mechanism of at least two default beams, and the network device also starts the mechanism of at least two default beams, that is, the network device instructs, through the first signaling, the terminal to use at least two pieces of default beam information, and the network device itself also starts the mechanism of at least two default beams; or when the terminal determines that the channel and/or the reference signal included in the set corresponding to the default beam information is not configured with beam information, the terminal uses at least two pieces of default beam information, and the network device also uses at least two pieces of default beam information.

For example, step 12 may include:

determining, in a case that downlink control information DCI corresponding to a preset channel does not include a TCI field, or in a case that DCI corresponding to a preset channel includes a TCI field but the TCI field is disabled through network signaling, or in a case that DCI corresponding to a preset channel includes a TCI field indicating beam information, or in a case that DCI corresponding to a preset channel does not include SRI information, or in a case that DCI corresponding to a preset channel includes SRI information indicating beam information, beam information of the preset channel according to the default beam information corresponding to the set in which the preset channel is located.

If the preset channel is a PDSCH, in a case that DCI corresponding to the PDSCH does not include a TCI field, or in a case that DCI corresponding to the PDSCH includes a TCI field but the TCI field is disabled through network signaling (for example, RRC signaling), or in a case that DCI corresponding to the preset channel includes a TCI field indicating beam information, beam information of the preset channel is determined according to the default beam information corresponding to the set in which the preset channel is located. In other words, for the PDSCH, regardless of whether the DCI indicates the TCI state of the PDSCH, or the DCI does not include the TCI field, or the network device disables the TCI field through the RRC signaling, the beam information of the preset PDSCH is determined according to the default beam information corresponding to the set in which the preset PDSCH is located.

For the PDSCH, a manner of determining beam information may be: when the DCI indicates a TCI state of the PDSCH, and a scheduling offset is greater than or equal to a preset threshold (that is, the indication is valid), the beam information of the PDSCH is determined according to the TCI state indicated by the DCI.

If the preset channel is a PUSCH, in a case that DCI corresponding to the PUSCH does not include SRI information, or in a case that DCI corresponding to the PUSCH includes SRI information indicating beam information, beam information of the preset channel is determined according to the default beam information corresponding to the set in which the preset channel is located. In other words, for the PUSCH, regardless of whether the DCI indicates the SRI information of the PUSCH, the beam information of the preset PUSCH is determined according to the default beam information corresponding to the set in which the preset PUSCH is located.

For the PUSCH, a manner of determining beam information may be: when the DCI indicates SRI information, beam information of the PUSCH is determined according to the SRI information.

A manner of determining beam information of an SRS may be specified in a protocol or configured by the network device, and the beam information of the SRS is determined according to one of the at least two pieces of default beam information; or beam information of an SRS is determined according to a usage of an SRS resource set configured through RRC signaling, that is, for an SRS with a different usage, beam information of the SRS is determined according to corresponding default beam information.

For example, step 11 may include:
determining the at least two pieces of default beam information according to preset beam information of a first Component Carrier (CC) and/or a first Bandwidth Part (BWP).

For example, the first CC may include any one of the following:

First type: a CC on which the channel or the reference signal included in the set corresponding to the default beam information is located.

Second type: a CC with a preset index in a frequency band covering the CC on which the channel or the reference signal included in the set corresponding to the default beam information is located, for example, a CC with a minimum cell index.

Third type: a CC with a preset index in a CC list or a cell group covering the CC on which the channel or the reference signal included in the set corresponding to the default beam information is located, for example, a CC with a minimum cell index. The first CC is not merely limited to one of the foregoing three types.

For example, the first BWP may be an active BWP.

For example, in a case that the default beam information includes first default beam information of a first TRP, the preset beam information may include any one of the following:

First type: beam information of a preset channel, for example, TCI state or QCL information of a CORESET with a preset CORESET Identifier (id).

Second type: TCI state information or QCL information of a first control resource set (for example, CORESET #0).

Third type: TCI state information or QCL information of a second control resource set with a target control resource set identifier (minimum CORESET id).

Fourth type: beam information other than TCI state information or QCL information of control resource sets.

In a scenario of single-TRP, the preset beam information may include any one of the first type, the second type, and the third type; in a scenario of single-DCI multi-TRP, the first three types are preset beam information corresponding to a TRP sending the DCI, and the fourth type is preset beam information corresponding to a TRP not sending the DCI; and in a scenario of multi-DCI multi-TRP, preset beam information corresponding to each TRP is any one of the first three types.

For example, in a case that the default beam information includes second default beam information of a first TRP, the preset beam information may include any one of the following:

First type: first TCI state information corresponding to a first codepoint among codepoints corresponding to one piece of TCI state information of codepoints of a TCI field of DCI sent by the first TRP.

Second type: second TCI state information corresponding to a second codepoint of the TCI field of the DCI sent by the first TRP, where in a case that the second codepoint corresponds to two or more pieces of TCI state information, the second TCI state information is one of the two or more pieces of TCI state information.

For example, in a case of the first type, the first codepoint may be a lowest codepoint corresponding to one piece of TCI state information of the codepoints of the TCI field of the DCI. That is, the preset beam information may be TCI state information corresponding to the lowest codepoint among the codepoints including only one piece of TCI state information of the codepoints of the TCI field of the DCI.

For example, in a case of the second type, the second codepoint may be the lowest codepoint among the codepoints of the TCI field of the DCI. In other words, the preset beam information may be TCI state information corresponding to the lowest codepoint among the codepoints of the TCI field of the DCI. If the lowest codepoint corresponds to two TCI states, it is required that the two TCI states are the same; or if the two TCI states are different, a first TCI state is used or a second TCI state is used.

In a scenario of single-TRP, the preset beam information may include any one of the first type and the second type; and in a scenario of multi-DCI multi-TRP, preset beam information corresponding to each TRP is any one of the foregoing two types.

For example, in a case that the default beam information includes second default beam information of a first TRP and second default beam information of one or more other TRPs, preset beam information corresponding to the first TRP may include:

third TCI state information corresponding to a third codepoint in a TCI field of DCI sent by the first TRP; and preset beam information corresponding to the one or more other TRPs includes:

other TCI state information corresponding to the third codepoint in the TCI field of the DCI sent by the first TRP, where the third codepoint corresponds to two or more pieces of TCI state information, the third TCI state information is any one of the two or more pieces of TCI state information, and the other TCI state information is TCI state information other than the third TCI state information of the two or more pieces of TCI state information.

For example, the third codepoint may be a lowest codepoint among codepoints corresponding to two or more pieces of TCI state information in the TCI field of the DCI.

In a scenario of single-DCI multi-TRP, if there are two TRPs, and the third codepoint corresponds to two pieces of TCI state information, in two pieces of TCI state information corresponding to a lowest codepoint among codepoints including two TCI states on codepoints in the TCI field of the DCI sent by the first TRP, the third state information is one of the two pieces of TCI state information, and preset beam information corresponding to the other TRP is the other piece of TCI state information.

If there are three TRPs, and the third codepoint corresponds to three pieces of TCI state information, in three pieces of TCI state information corresponding to a lowest codepoint among codepoints including three TCI states on codepoints in the TCI field of the DCI sent by the first TRP, the third state information is one of the three pieces of TCI state information, preset beam information corresponding to a second TRP of one or more other TRPs is one of two pieces of other TCI state information, and preset beam information corresponding to a third TRP of the one or more other TRPs is the other of the two pieces of other TCI state information. The quantity of TRPs and the quantity of TCI state information corresponding to the third codepoint are not specifically limited herein.

In the foregoing embodiment of the present disclosure, by determining an association relation between at least two pieces of default beam information and different sets, signaling overheads of beam indication of each channel or reference signal may be reduced; and by using different default beam information for channels and/or reference signals included in different sets, requirements for different performance objectives, for example, reliability of a control channel and high-rate transmission of a service channel are met.

Figure 2:
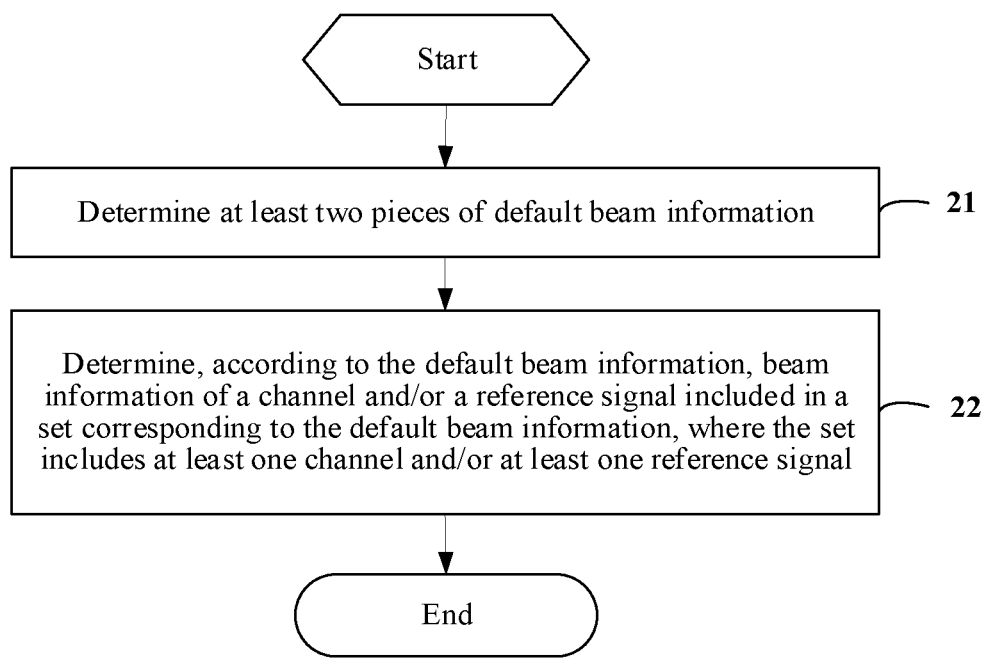
FIG. 2 is a second schematic flowchart of a beam information determining method according to an embodiment of the present disclosure.

As shown in FIG. 2, an embodiment of the present disclosure further provides a beam information determining method, applicable to a first TRP and including:

Step 21. Determine at least two pieces of default beam information.

A manner of determining default beam information may be as follows: A network device determines a plurality of (for example, two) RS resources according to a beam report sent by a terminal, and use beam information corresponding to the plurality of RS resources as default beam information. For example, a same source RS in TCI states or spatial relations of channels and/or reference signals may be determined as one of the plurality of RS resources. When a beam report is a group based beam report, the network device determines a plurality of RS resources according to the beam report, and uses beam information corresponding to the plurality of RS resources as default beam information, and the determined default beam information may be received by the terminal simultaneously.

Step 22. Determine, according to the default beam information, beam information of a channel and/or a reference signal included in a set corresponding to the default beam information, where the set includes at least one channel and/or at least one reference signal.

In the foregoing embodiment of the present disclosure, at least two pieces of default beam information are determined, and beam information of a channel and/or a reference signal included in a set corresponding to the default beam information is determined according to the default beam information, where the set includes at least one channel and/or at least one reference signal, thereby not only reducing signaling overheads of performing beam indication by each channel and/or reference signal, but also using different default beam information for different sets, to meet requirements for different performance objectives.

For example, the method may further include:

sending the at least two pieces of default beam information that are determined.

After the at least two pieces of default beam information are determined, the at least two pieces of default beam information are sent to the terminal, so that the terminal determines beam information of a channel and/or a reference signal included in the set corresponding to the default beam information according to the default beam information.

For example, the method may further include:

updating the default beam information; and determining, according to the updated default beam information, beam information of a channel and/or a reference signal included in the set corresponding to the default beam information.

After the first TRP updates the default beam information, the updated default beam information may be sent to the terminal, so that the terminal determines beam information of a channel and/or a reference signal included in the set corresponding to the default beam information according to the updated default beam information.

For example, the method may further include:

updating beam information of a first channel and/or a first reference signal included in the set corresponding to the default beam information; and determining, according to the updated beam information of the first channel and/or the first reference signal, beam information of one or more other channels and/or one or more other reference signals included in the set.

After the first TRP updates the beam information of the first channel and/or the first reference signal, the updated beam information may be sent to the terminal, so that the terminal determines beam information of one or more other channels and/or one or more other reference signals included in the set according to the updated beam information.

For example, the method may further include:

sending first signaling, where the first signaling is used for instructing the terminal to use the default beam information.

The first signaling is sent to the terminal, and is used for instructing the terminal to use the default beam information, and the first TRP also uses the default beam information; and if the first TRP does not configure beam information of a channel and/or a reference signal included in the set corresponding to the default beam information, the first TRP uses the default beam information.

For example, step 22 includes:

determining, in a case that DCI corresponding to a preset channel does not include a TCI field, or in a case that DCI corresponding to a preset channel includes a TCI field but the TCI field is disabled through network signaling, or in a case that DCI corresponding to a preset channel includes a TCI field indicating beam information, or in a case that DCI corresponding to a preset channel does not include SRI information, or in a case that DCI corresponding to a preset channel includes SRI information indicating beam information, beam information of the preset channel according to the default beam information corresponding to the set in which the preset channel is located.

For example, step 21 includes:

determining the at least two pieces of default beam information according to preset beam information of a first component carrier CC and/or a first bandwidth part BWP.

For example, the first CC may include any one of the following:

First type: a CC on which the channel or the reference signal included in the set corresponding to the default beam information is located.

Second type: a CC with a preset index in a frequency band covering the CC on which the channel or the reference signal included in the set corresponding to the default beam information is located, for example, a CC with a minimum cell index.

Third type: a CC with a preset index in a CC list or a cell group covering the CC on which the channel or the reference signal included in the set corresponding to the default beam information is located, for example, a CC with a minimum cell index. The first CC is not merely limited to one of the foregoing three types.

For example, the first BWP may be an active BWP.

For example, in a case that the default beam information includes first default beam information of a first TRP, the preset beam information may include any one of the following:

First type: beam information of a preset channel, for example, TCI state or QCL information of a CORESET with a preset CORESET id.

Second type: TCI state information or QCL information of a first control resource set (for example, CORESET #0).

Third type: TCI state information or QCL information of a second control resource set with a target control resource set identifier (minimum CORESET id).

Fourth type: beam information other than TCI state information or QCL information of control resource sets.

In a scenario of single-TRP or multi-DCI multi-TRP, the preset beam information may include any one of the first type, the second type, and the third type; and in a scenario of single-DCI multi-TRP, if the first TRP sends DCI, preset beam information corresponding to the first TRP is any one of the first three types; and if the first TRP does not send DCI, preset beam information corresponding to the first TRP is the fourth type.

For example, in a case that the default beam information includes second default beam information of a first TRP, the preset beam information includes any one of the following:

First type: first TCI state information corresponding to a first codepoint among codepoints corresponding to one piece of TCI state information of codepoints of a TCI field of DCI sent by the first TRP.

Second type: second TCI state information corresponding to a second codepoint of the TCI field of the DCI sent by the first TRP, where in a case that the second codepoint corresponds to two or more pieces of TCI state information, the second TCI state information is one of the two or more pieces of TCI state information.

For example, the first codepoint is a lowest codepoint among the codepoints corresponding to one piece of TCI state information of the codepoints of the TCI field of the DCI.

For example, the second codepoint is a lowest codepoint among the codepoints of the TCI field of the DCI.

For example, in a case that the default beam information includes second default beam information of a first TRP and second default beam information of one or more other TRPs, preset beam information corresponding to the first TRP includes:

third TCI state information corresponding to a third codepoint in a TCI field of DCI sent by the first TRP; and preset beam information corresponding to the one or more other TRPs includes:

other TCI state information corresponding to the third codepoint in the TCI field of the DCI sent by the first TRP, where the third codepoint corresponds to two or more pieces of TCI state information, the third TCI state information is any one of the two or more pieces of TCI state information, and the other TCI state information is TCI state information other than the third TCI state information of the two or more pieces of TCI state information.

For example, the third codepoint is a lowest codepoint among codepoints corresponding to two or more pieces of TCI state information in the TCI field of the DCI.

It should be noted that, in the foregoing embodiment, all descriptions about the embodiment of the beam information determining method applicable to a terminal are applicable to the embodiment of the beam information determining method applicable to a first TRP, the same technical effect can also be achieved, and details are not described herein.

In the foregoing embodiment of the present disclosure, by determining an association relation between at least two pieces of default beam information and different sets, signaling overheads of beam indication of each channel or reference signal may be reduced; and by using different default beam information for channels and/or reference signals included in different sets, requirements for different performance objectives, for example, reliability of a control channel and high-rate transmission of a service channel are met.

Figure 3:
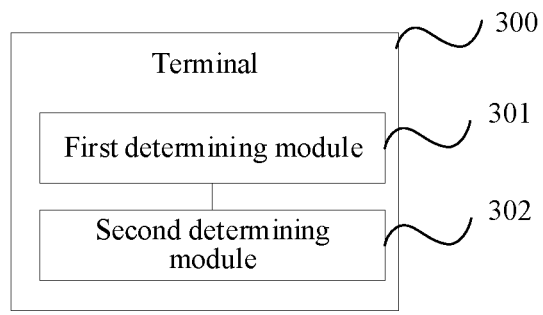
FIG. 3 is a schematic diagram of modules of a terminal according to an embodiment of the present disclosure.

As shown in FIG. 3, an embodiment of the present disclosure further provides a terminal 300, including:

a first determining module 301, configured to determine at least two pieces of default beam information; and a second determining module 302, configured to determine, according to the default beam information, beam information of a channel and/or a reference signal included in a set corresponding to the default beam information, where the set includes at least one channel and/or at least one reference signal.

For example, the first determining module 301 includes:

a receiving unit, configured to receive the at least two pieces of default beam information configured by a transmitting and receiving point TRP.

For example, the terminal further includes:

a first update module, configured to determine updated default beam information; and a second update module, configured to determine, according to the updated default beam information, beam information of a channel and/or a reference signal included in the set corresponding to the default beam information.

For example, the terminal further includes:

a first processing module, configured to determine updated beam information of a first channel and/or a first reference signal included in the set corresponding to the default beam information; and a second processing module, configured to determine, according to the updated beam information of the first channel and/or the first reference signal, beam information of one or more other channels and/or one or more other reference signals included in the set.

For example, the terminal further includes:

a receiving module, configured to receive first signaling, where the first signaling is used for instructing the terminal to use the default beam information;

or a third processing module, configured to determine that the channel and/or the reference signal included in the set corresponding to the default beam information is not configured with beam information.

For example, the second determining module 302 includes:

a first determining unit, configured to determine, in a case that downlink control information DCI corresponding to a preset channel does not include a TCI field, or in a case that DCI corresponding to a preset channel includes a TCI field but the TCI field is disabled through network signaling, or in a case that DCI corresponding to a preset channel includes a TCI field indicating beam information, or in a case that DCI corresponding to a preset channel does not include SRI information, or in a case that DCI corresponding to a preset channel includes SRI information indicating beam information, beam information of the preset channel according to the default beam information corresponding to the set in which the preset channel is located.

For example, the first determining module 302 includes:

a second determining unit, configured to determine the at least two pieces of default beam information according to preset beam information of a first component carrier CC and/or a first bandwidth part BWP.

For example, the first CC includes any one of the following:

a CC on which the channel or the reference signal included in the set corresponding to the default beam information is located;

a CC with a preset index in a frequency band covering the CC on which the channel or the reference signal included in the set corresponding to the default beam information is located; and a CC with a preset index in a CC list or a cell group covering the CC on which the channel or the reference signal included in the set corresponding to the default beam information is located.

For example, the first BWP is an active BWP.

For example, in a case that the default beam information includes first default beam information of a first transmitting and receiving point TRP, the preset beam information includes any one of the following:

beam information of a preset channel;

TCI state information or QCL information of a first control resource set;

TCI state information or QCL information of a second control resource set with a target control resource set identifier; and beam information other than TCI state information or QCL information of control resource sets.

For example, in a case that the default beam information includes second default beam information of a first TRP, the preset beam information includes any one of the following:

first TCI state information corresponding to a first codepoint among codepoints corresponding to one piece of TCI state information of codepoints of a TCI field of DCI sent by the first TRP; and second TCI state information corresponding to a second codepoint of the TCI field of the DCI sent by the first TRP, where in a case that the second codepoint corresponds to two or more pieces of TCI state information, the second TCI state information is one of the two or more pieces of TCI state information.

For example, the first codepoint is a lowest codepoint among the codepoints corresponding to one piece of TCI state information of the codepoints of the TCI field of the DCI.

For example, the second codepoint is a lowest codepoint among the codepoints of the TCI field of the DCI.

For example, in a case that the default beam information includes second default beam information of a first TRP and second default beam information of one or more other TRPs, preset beam information corresponding to the first TRP includes:

third TCI state information corresponding to a third codepoint in a TCI field of DCI sent by the first TRP; and preset beam information corresponding to the one or more other TRPs includes:

other TCI state information corresponding to the third codepoint in the TCI field of the DCI sent by the first TRP, where the third codepoint corresponds to two or more pieces of TCI state information, the third TCI state information is any one of the two or more pieces of TCI state information, and the other TCI state information is TCI state information other than the third TCI state information of the two or more pieces of TCI state information.

For example, the third codepoint is a lowest codepoint among codepoints corresponding to two or more pieces of TCI state information in the TCI field of the DCI.

It should be noted that, the terminal embodiment is the terminal corresponding to the foregoing beam information determining method applicable to a terminal, all implementations in the foregoing embodiment are applicable to the terminal embodiment, and the same technical effect can also be achieved.

Figure 4:
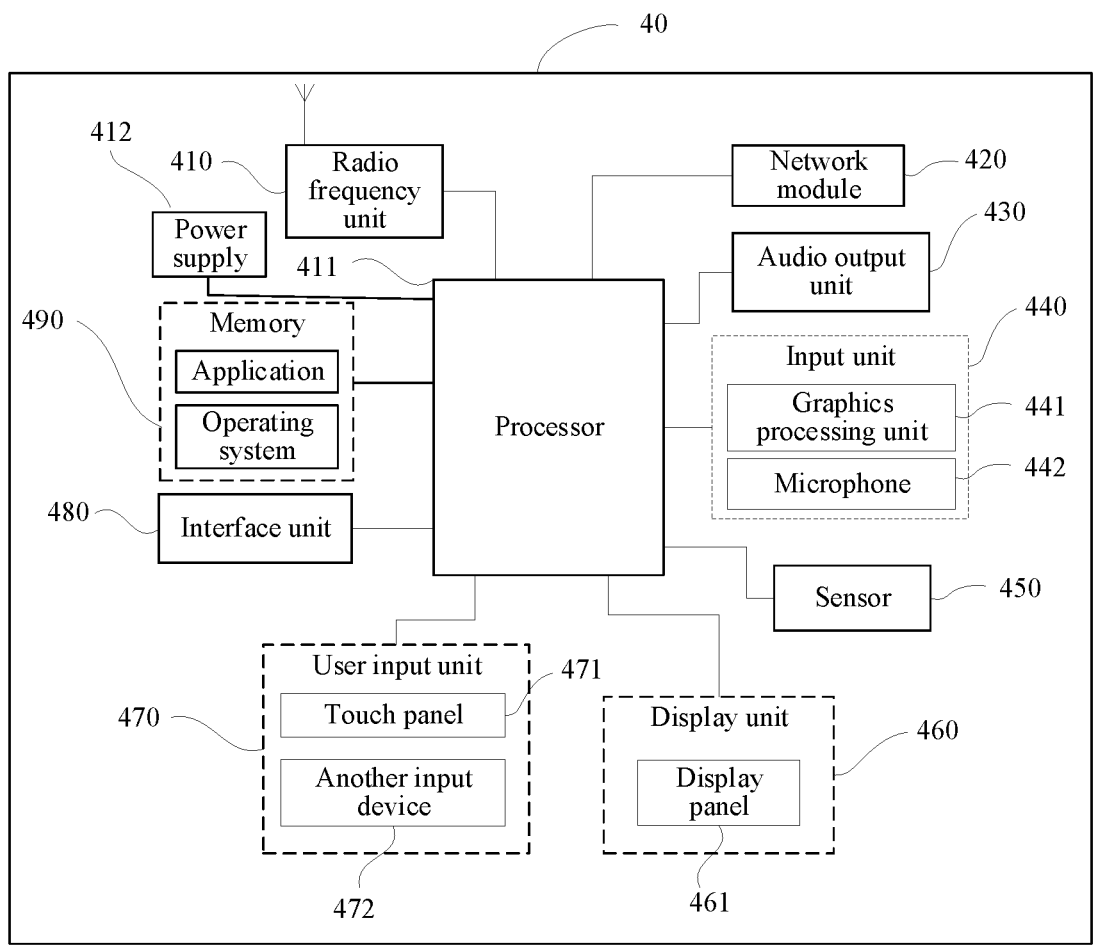
FIG. 4 is a structural block diagram of a terminal according to an embodiment of the present disclosure.

FIG. 4 is a schematic structural diagram of hardware of a terminal implementing an embodiment of the present disclosure.

The terminal 40 includes, but is not limited to, components such as a radio frequency unit 410, a network module 420, an audio output unit 430, an input unit 440, a sensor 450, a display unit 460, a user input unit 470, an interface unit 480, a memory 490, a processor 411, and a power supply 412. A person skilled in the art may understand that the terminal structure shown in FIG. 4 does not constitute a limitation on the terminal, and the terminal may include more or fewer components than shown, or combine some components, or have different component arrangements. In this embodiment of the present disclosure, the terminal includes, but is not limited to, a mobile phone, a tablet computer, a notebook computer, a handheld computer, an in-vehicle terminal, a wearable device, a pedometer, and the like.

The processor 411 is configured to determine at least two pieces of default beam information; and determine, according to the default beam information, beam information of a channel and/or a reference signal included in a set corresponding to the default beam information, where the set includes at least one channel and/or at least one reference signal.

It should be understood that in this embodiment of the present disclosure, the radio frequency unit 410 is configured to receive and send signals during an information receiving and sending process or a call process. To be specific, the radio frequency unit is configured to receive downlink data from a network side device, send the downlink data to the processor 411 for processing, and send uplink data to the network side device. Generally, the radio frequency unit 410 includes, but is not limited to, an antenna, at least one amplifier, a transceiver, a coupler, a low noise amplifier, a duplexer, and the like. In addition, the radio frequency unit 410 may further communicate with a network device and another device through a wireless communication system.

The terminal may provide, by using the network module 420, wireless broadband Internet access for a user, for example, help the user to receive or send an email, browse a web page, and access stream media.

The audio output unit 430 may convert audio data received by the radio frequency unit 410 or the network module 420 or stored in the memory 490 into an audio signal and output the audio signal as a sound. In addition, the audio output unit 430 may provide an audio output (such as a call signal receiving sound or a message receiving sound) related to a specific function executed by the terminal 40. The audio output unit 430 includes a speaker, a buzzer, a receiver, and the like.

The input unit 440 is configured to receive an audio or video signal. The input unit 440 may include a Graphics Processing Unit (GPU) 441 and a microphone 442. The graphics processing unit 441 performs processing on image data of a static picture or a video that is obtained by an image acquisition device (for example, a camera) in a video acquisition mode or an image acquisition mode. An image frame that has been processed may be displayed on the display unit 460. An image frame processed by the graphics processing unit 441 may be stored in the memory 490 (or other storage media) or sent by the radio frequency unit 410 or the network module 420. The microphone 442 can receive a sound and can process the sound into audio data. The processed audio data may be transferred, in a phone talk mode, to a format that may be sent to a mobile communication network side device via the radio frequency unit 410 to output.

The terminal 40 further includes at least one sensor 450 such as an optical sensor, a motion sensor, or another sensor. In some embodiments, the optical sensor includes an ambient light sensor and a proximity sensor. The optical sensor may include an ambient light sensor and a proximity sensor, where the ambient light sensor may adjust luminance of the display panel 461 according to the luminance of the ambient light, and the proximity sensor may switch off the display panel 461 and/or backlight when the terminal 40 is moved to the ear. As one type of motion sensor, an acceleration sensor may detect magnitude of accelerations in various directions (generally on three axes), and detect the magnitude and direction of gravity at rest. The acceleration sensor is configured to recognize the attitude of the terminal (for example, switching between landscape orientation and portrait orientation, related gaming, and magnetometer attitude calibration), a function related to vibration recognition (such as a pedometer and a knock), and the like. The sensor 450 may further include a fingerprint sensor, a pressure sensor, an iris sensor, a molecular sensor, a gyroscope, a barometer, a hygrometer, a thermometer, an infrared sensor, and the like, which will not be described in detail herein.

The display unit 460 is configured to display information input by the user or information provided for the user. The display unit 460 may include a display panel 461. The display panel 461 may be configured by using a Liquid Crystal Display (LCD), an Organic Light-Emitting Diode (OLED), or the like.

The user input unit 470 may be configured to receive input digit or character information, and generate a keyboard signal input related to the user setting and function control of the terminal. In some embodiments, the user input unit 470 includes a touch panel 471 and another input device 472. The touch panel 471, also referred to as a touchscreen, is configured to collect a touch operation made by the user on or in proximity to the touch panel 471 (for example, an operation made by the user through any appropriate object or attachment (for example, finger or stylus) on or in proximity to the touch panel 471). The touch panel 471 may include two parts: a touch detection apparatus and a touch controller. The touch detection apparatus is configured to detect a touch position of the user and a signal generated due to the touch operation, and transmit the signal to the touch controller. The touch controller is configured to receive touch information from the touch detection apparatus, convert the touch information into coordinates of a touch point, transmit the coordinates to the processor 411, and receive and execute a command sent from the processor 411. In addition, the touch panel 471 may be implemented by using various types, such as a resistive type, a capacitive type, an infrared type, and a surface acoustic wave type. In addition to the touch panel 471, the user input unit 470 may further include the another input device 472. In some embodiments, the another input device 472 may include, but is not limited to, a physical keyboard, a functional key (for example, a volume control key or a switch key), a track ball, a mouse, and a joystick, and details are not described herein again.

Further, the touch panel 471 may cover the display panel 461. When detecting a touch operation made on or in proximity to the touch panel 471, the touch panel transmits the touch information to the processor 411 so as to determine a type of a touch event. Then, the processor 411 provides a corresponding visual output on the display panel 461 in accordance with the type of the touch event. Although the touch panel 471 and the display panel 461 are used as two separate parts to implement input and output functions of the terminal in FIG. 4, in some embodiments, the touch panel 471 and the display panel 461 may be integrated to implement the input and output functions of the terminal, which is not limited herein.

The interface unit 480 is an interface for connecting an external apparatus and the terminal 40. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 480 may be configured to receive input (for example, data information or power) from an external apparatus and transmit the received input to one or more elements in the terminal 40 or may be configured to transmit data between the terminal 40 and the external apparatus.

The memory 490 may be configured to store a software program and various data. The memory 490 may mainly include a program storage region and a data storage region. The program storage region may store an operating system, an application (for example, a sound play function or an image play function) required by at least one function, and the like. The data storage region may store data (for example, audio data or a phonebook) that is created during use of the mobile phone, and the like. In addition, the memory 440 may include a high-speed random access memory, and may further include a nonvolatile memory, such as at least one magnetic disk storage device, a flash memory, or another volatile solid-state storage device.

The processor 411 is the control center of the terminal, and is connected to various parts of the terminal by various interfaces and lines. By running or executing the software program and/or module stored in the memory 490 and invoking data stored in the memory 490, the processor performs various functions of the terminal and processes data, thereby monitoring the terminal. The processor 411 may include one or more processing units. For example, the processor 411 may integrate an application processor and a modem processor. The application processor mainly handles operating systems, user interfaces, applications, and the like. The modem processor mainly handles wireless communication. It may be understood that, the modem processor may not be integrated in the processor 411.

The terminal 40 may further include the power source 412 (such as a battery) configured to supply power to the components. For example, the power source 412 may be logically connected to the processor 411 by a power management system, so as to implement functions such as charging, discharging, and power consumption management via the power management system.

In addition, the terminal 40 includes some functional module that are not shown, which are not described herein in detail.

For example, an embodiment of the present disclosure further provides a terminal, including a processor 411, a memory 490, and a computer program stored in the memory 490 and runnable on the processor 411. The computer program, when being executed by the processor 411, implements each process of the beam information determining method applicable to a terminal, and can achieve the same technical effect. To avoid repetition, details are not described herein again.

An embodiment of the present disclosure further provides a computer-readable storage medium storing a computer program. The computer program is executable by a processor to implement each process of the beam information determining method applicable to a terminal, and the same technical effects can be achieved, which will not be described in detail herein again to avoid repetition. The computer-readable storage medium may include a flash drive, a Read-Only Memory (ROM), a Random Access Memory (RAM), a magnetic disk, or an optical disc.

Figure 5:
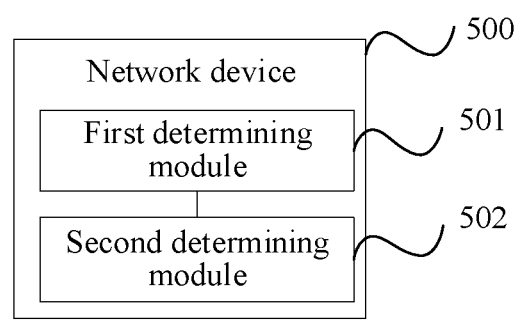
FIG. 5 is a schematic diagram of modules of a network device according to an embodiment of the present disclosure.

As shown in FIG. 5, an embodiment of the present disclosure further provides a network device 500. The network device is a first TRP and includes:

a third determining module 501, configured to determine at least two pieces of default beam information; and a fourth determining module 502, configured to determine, according to the default beam information, beam information of a channel and/or a reference signal included in a set corresponding to the default beam information, where the set includes at least one channel and/or at least one reference signal.

For example, the network device further includes:
a first sending module, configured to send the at least two pieces of default beam information that are determined.

For example, the network device further includes:
a third update module, configured to update the default beam information; and
a fourth update module, configured to determine, according to the updated default beam information, beam information of a channel and/or a reference signal included in the set corresponding to the default beam information.

For example, the network device further includes:
a fifth update module, configured to update beam information of a first channel and/or a first reference signal included in the set corresponding to the default beam information; and
a sixth update module, configured to determine, according to the updated beam information of the first channel and/or the first reference signal, beam information of one or more other channels and/or one or more other reference signals included in the set.

For example, the network device further includes:
a second sending module, configured to send first signaling, where the first signaling is used for instructing the terminal to use the default beam information.

For example, the fourth determining module 502 includes:
a third determining unit, configured to determine, in a case that downlink control information DCI corresponding to a preset channel does not include a TCI field, or in a case that DCI corresponding to a preset channel includes a TCI field but the TCI field is disabled through network signaling, or in a case that DCI corresponding to a preset channel includes a TCI field indicating beam information, or in a case that DCI corresponding to a preset channel does not include SRI information, or in a case that DCI corresponding to a preset channel includes SRI information indicating beam information, beam information of the preset channel according to the default beam information corresponding to the set in which the preset channel is located.

For example, the third determining module 501 includes:
a fourth determining unit, configured to determine the at least two pieces of default beam information according to preset beam information of a first component carrier CC and/or a first bandwidth part BWP.

For example, the first CC includes any one of the following:
a CC on which the channel or the reference signal included in the set corresponding to the default beam information is located;
a CC with a preset index in a frequency band covering the CC on which the channel or the reference signal included in the set corresponding to the default beam information is located;
and
a CC with a preset index in a CC list or a cell group covering the CC on which the channel or the reference signal included in the set corresponding to the default beam information is located.

For example, the first BWP is an active BWP.

For example, in a case that the default beam information includes first default beam information of a first transmitting and receiving point TRP, the preset beam information includes any one of the following:
beam information of a preset channel;
TCI state information or QCL information of a first control resource set;
TCI state information or QCL information of a second control resource set with a target control resource set identifier; and
beam information other than TCI state information or QCL information of control resource sets.

For example, in a case that the default beam information includes second default beam information of a first TRP, the preset beam information includes any one of the following:
first TCI state information corresponding to a first codepoint among codepoints corresponding to one piece of TCI state information of codepoints of a TCI field of DCI sent by the first TRP; and second TCI state information corresponding to a second codepoint of the TCI field of the DCI sent by the first TRP, where in a case that the second codepoint corresponds to two or more pieces of TCI state information, the second TCI state information is one of the two or more pieces of TCI state information.

For example, the first codepoint is a lowest codepoint among the codepoints corresponding to one piece of TCI state information of the codepoints of the TCI field of the DCI.

For example, the second codepoint is a lowest codepoint among the codepoints of the TCI field of the DCI.

For example, in a case that the default beam information includes second default beam information of a first TRP and second default beam information of one or more other TRPs, preset beam information corresponding to the first TRP includes:

third TCI state information corresponding to a third codepoint in a TCI field of DCI sent by the first TRP; and preset beam information corresponding to the one or more other TRPs includes:

other TCI state information corresponding to the third codepoint in the TCI field of the DCI sent by the first TRP, where the third codepoint corresponds to two or more pieces of TCI state information, the third TCI state information is any one of the two or more pieces of TCI state information, and the other TCI state information is TCI state information other than the third TCI state information of the two or more pieces of TCI state information.

For example, the third codepoint is a lowest codepoint among codepoints corresponding to two or more pieces of TCI state information in the TCI field of the DCI.

It should be noted that, the network device embodiment is the network device corresponding to the foregoing beam information determining method applicable to a first TRP, all implementations in the foregoing embodiment are applicable to the network device embodiment, and the same technical effect can also be achieved.

An embodiment of the present disclosure further provides a network device, including a memory, a processor, and a computer program stored in the memory and runnable on the processor. The computer program, when being executed by the processor, implements each process of the beam information determining method applicable to a network device, and can achieve the same technical effect. To avoid repetition, details are not described herein again.

An embodiment of the present disclosure further provides a computer-readable storage medium storing a computer program. The computer program is executable by a processor to implement each process of the foregoing beam information determining method applicable to a network device, and the same technical effects can be achieved, which will not be described in detail herein again to avoid repetition. The computer-readable storage medium may include a flash drive, a ROM, a RAM, a magnetic disk, or an optical disc.

Figure 6:
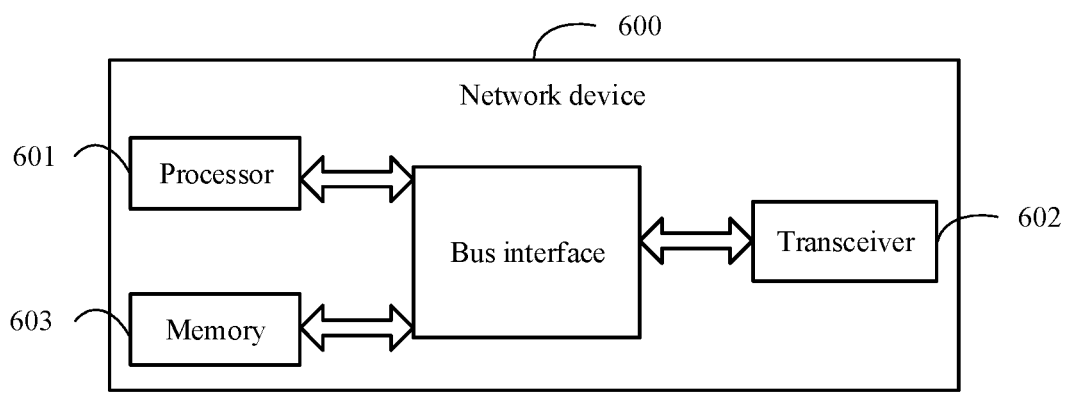
FIG. 6 is a structural block diagram of a network device according to an embodiment of the present disclosure.

FIG. 6 is a structural diagram of a network device according to an embodiment of the present disclosure, which can implement the foregoing details of determining beam information, and achieve the same effect. As shown in FIG. 6, the network device 600 includes: a processor 601, a transceiver 602, a memory 603, and a bus interface.

The processor 601 is configured to read a program in the memory 603, to perform the following processes:

determining at least two pieces of default beam information; and determining, according to the default beam information, beam information of a channel and/or a reference signal included in a set corresponding to the default beam information, where the set includes at least one channel and/or at least one reference signal.

In FIG. 6, a bus architecture may include any quantity of interconnected buses and bridges, which are linked by various circuits of one or more processors represented by the processor 601 and memories represented by the memory 603. The bus architecture may further connect various other circuits such as a peripheral device, a voltage stabilizer, and a power management circuit. These are known in the art, and therefore are not further described in this specification. The bus interface provides an interface. The transceiver 602 may be a plurality of components, including a transmitter and a receiver, and providing units for communicating with various other apparatuses on a transmission medium.

For example, the processor 601 is further configured to:
send the at least two pieces of default beam information that are determined.

For example, the processor 601 is further configured to:
update the default beam information; and
determine, according to the updated default beam information, beam information of a channel and/or a reference signal included in the set corresponding to the default beam information.

For example, the processor 601 is further configured to:
update beam information of a first channel and/or a first reference signal included in the set corresponding to the default beam information; and
determine, according to the updated beam information of the first channel and/or the first reference signal, beam information of one or more other channels and/or one or more other reference signals included in the set.

For example, the processor 601 is further configured to:
send first signaling, where the first signaling is used for instructing the terminal to use the default beam information.

For example, when determining, according to the default beam information, beam information of a channel and/or a reference signal included in a set corresponding to the default beam information, the processor 601 is configured to:

determine, in a case that downlink control information DCI corresponding to a preset channel does not include a TCI field, or in a case that DCI corresponding to a preset channel includes a TCI field but the TCI field is disabled through network signaling, or in a case that DCI corresponding to a preset channel includes a TCI field indicating beam information, or in a case that DCI corresponding to a preset channel does not include SRI information, or in a case that DCI corresponding to a preset channel includes SRI information indicating beam information, beam information of the preset channel according to the default beam information corresponding to the set in which the preset channel is located.

For example, when determining the at least two pieces of default beam information, the processor 601 is configured to:

determine the at least two pieces of default beam information according to preset beam information of a first component carrier CC and/or a first bandwidth part BWP.

For example, the first CC includes any one of the following:

a CC on which the channel or the reference signal included in the set corresponding to the default beam information is located;

a CC with a preset index in a frequency band covering the CC on which the channel or the reference signal included in the set corresponding to the default beam information is located;
and
a CC with a preset index in a CC list or a cell group covering the CC on which the channel or the reference signal included in the set corresponding to the default beam information is located.

For example, the first BWP is an active BWP.

For example, in a case that the default beam information includes first default beam information of a first transmitting and receiving point TRP, the preset beam information includes any one of the following:

beam information of a preset channel;

TCI state information or QCL information of a first control resource set;

TCI state information or QCL information of a second control resource set with a target control resource set identifier; and beam information other than TCI state information or QCL information of control resource sets.

For example, in a case that the default beam information includes second default beam information of a first TRP, the preset beam information includes any one of the following:

first TCI state information corresponding to a first codepoint among codepoints corresponding to one piece of TCI state information of codepoints of a TCI field of DCI sent by the first TRP; and second TCI state information corresponding to a second codepoint of the TCI field of the DCI sent by the first TRP, where in a case that the second codepoint corresponds to two or more pieces of TCI state information, the second TCI state information is one of the two or more pieces of TCI state information.

For example, the first codepoint is a lowest codepoint among the codepoints corresponding to one piece of TCI state information of the codepoints of the TCI field of the DCI.

For example, the second codepoint is a lowest codepoint among the codepoints of the TCI field of the DCI.

For example, in a case that the default beam information includes second default beam information of a first TRP and second default beam information of one or more other TRPs, preset beam information corresponding to the first TRP includes:

third TCI state information corresponding to a third codepoint in a TCI field of DCI sent by the first TRP; and preset beam information corresponding to the one or more other TRPs includes:

other TCI state information corresponding to the third codepoint in the TCI field of the DCI sent by the first TRP, where the third codepoint corresponds to two or more pieces of TCI state information, the third TCI state information is any one of the two or more pieces of TCI state information, and the other TCI state information is TCI state information other than the third TCI state information of the two or more pieces of TCI state information.

For example, the third codepoint is a lowest codepoint among codepoints corresponding to two or more pieces of TCI state information in the TCI field of the DCI.

It should be noted that, the terms "include", "include", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and may be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A beam information determining method, executed by a terminal, comprising:
   determining at least two pieces of default beam information according to preset beam information of a first Component Carrier (CC) or a first Bandwidth Part (BWP),
   wherein in response to determining that the default beam information comprises: second default beam information of a first Transmitting and Receiving Point (TRP) and second default beam information of one or more other TRPs:
      preset beam information corresponding to the first TRP comprises: third Transmission Configuration Indication (TCI) state information corresponding to a third codepoint in a TCI field of Downlink Control Information (DCD) sent by the first TRP, and
      preset beam information corresponding to the one or more other TRPs comprises other TCI state information corresponding to the third codepoint in the TCI field of the DCI sent by the first TRP,
   wherein:
      the third codepoint corresponds to two or more pieces of TCI state information,
      the third TCI state information is any one of the two or more pieces of TCI state information, and
      the other TCI state information is TCI state information other than the third TCI state information of the two or more pieces of TCI state information; and
   determining, according to the default beam information, beam information of a channel or a reference signal comprised in a set corresponding to the default beam information, wherein the set comprises at least one channel or at least one reference signal, wherein:
different default beam information corresponds to different sets, and
manners of dividing the different sets comprise at least one of the following:
a control channel and a service channel belonging to the different sets, respectively;
the different sets comprising different source reference signals of channels or reference signals, respectively; or
the same type of channels being divided into the different sets according to different usages.

2. The beam information determining method according to claim 1, wherein the determining at least two pieces of default beam information comprises:
receiving the at least two pieces of default beam information configured by the first TRP or the one or more other TRPs.

3. The beam information determining method according to claim 1, further comprising:
determining updated default beam information; and
determining, according to the updated default beam information, the beam information of the channel or the reference signal comprised in the set corresponding to the default beam information.

4. The beam information determining method according to claim 1, further comprising:
determining updated beam information of a first channel or a first reference signal comprised in the set corresponding to the default beam information; and
determining, according to the updated beam information of the first channel or the first reference signal, beam information of one or more other channels or one or more other reference signals comprised in the set.

5. The beam information determining method according to claim 1, wherein before the determining, according to the default beam information, beam information of a channel or a reference signal comprised in a set corresponding to the default beam information, the method further comprises:
receiving first signaling, wherein the first signaling is used for instructing the terminal to use the default beam information; or
determining that the channel or the reference signal comprised in the set corresponding to the default beam information is not configured with beam information.

6. The beam information determining method according to claim 1, wherein the determining, according to the default beam information, beam information of a channel or a reference signal comprised in a set corresponding to the default beam information comprises:
determining,
in response to determining that DCI corresponding to a preset channel does not comprise a TCI field, or
in response to determining that DCI corresponding to a preset channel comprises a TCI field but the TCI field is disabled through network signaling, or
in response to determining that DCI corresponding to a preset channel comprises a TCI field indicating beam information, or
in response to determining that DCI corresponding to a preset channel does not comprise Spatial Relation Information (SRI) information, or
in response to determining that DCI corresponding to a preset channel comprises SRI information indicating beam information,
beam information of the preset channel according to the default beam information corresponding to the set in which the preset channel is located.

7. The beam information determining method according to claim 1, wherein the first CC comprises any one of the following:
a CC on which the channel or the reference signal comprised in the set corresponding to the default beam information is located;
a CC with a preset index in a frequency band covering the CC on which the channel or the reference signal comprised in the set corresponding to the default beam information is located; or
a CC with a preset index in a CC list or a cell group covering the CC on which the channel or the reference signal comprised in the set corresponding to the default beam information is located.

8. The beam information determining method according to claim 1, wherein the first BWP is an active BWP.

9. The beam information determining method according to claim 1,
wherein:
in response to determining that the default beam information comprises first default beam information of a first TRP, the preset beam information comprises any one of the following:
beam information of a preset channel;
TCI state information or Quasi-Colocation (QCL) information of a first control resource set;
TCI state information or QCL information of a second control resource set with a target control resource set identifier; or
beam information other than TCI state information or QCL information of control resource sets, or
in response to determining that the default beam information comprises second default beam information of the first TRP, the preset beam information comprises any one of the following:
first TCI state information corresponding to a first codepoint among codepoints corresponding to one piece of TCI state information of codepoints of a TCI field of DCI sent by the first TRP; or
second TCI state information corresponding to a second codepoint of the TCI field of the DCI sent by the first TRP, wherein in response to determining that the second codepoint corresponds to two or more pieces of TCI state information, the second TCI state information is one of the two or more pieces of TCI state information.

10. The beam information determining method according to claim 9, wherein the first codepoint is a lowest codepoint among the codepoints corresponding to one piece of TCI state information of the codepoints of the TCI field of the DCI.

11. The beam information determining method according to claim 9, wherein the second codepoint is a lowest codepoint among the codepoints of the TCI field of the DCI.

12. The beam information determining method according to claim 1, wherein the third codepoint is a lowest codepoint among the codepoints corresponding to two or more pieces of TCI state information in the TCI field of the DCI.

13. A terminal, comprising: a memory, a processor, and a computer program stored in the memory and executable by the processor, wherein the computer program, when executed by the processor, cause the processor to perform operations comprising:

determining at least two pieces of default beam information according to preset beam information of a first Component Carrier (CC) or a first Bandwidth Part (BWP), wherein in response to determining that the default beam information comprises second default beam information of a first Transmitting and Receiving Point (TRP) and second default beam information of one or more other TRPs:

preset beam information corresponding to the first TRP comprises third Transmission Configuration Indication (TCI) state information corresponding to a third codepoint in a TCI field of Downlink Control Information (DCD) sent by the first TRP, and preset beam information corresponding to the one or more other TRPs comprises other TCI state information corresponding to the third codepoint in the TCI field of the DCI sent by the first TRP, wherein:

the third codepoint corresponds to two or more pieces of TCI state information, the third TCI state information is any one of the two or more pieces of TCI state information, and the other TCI state information is TCI state information other than the third TCI state information of the two or more pieces of TCI state information; and determining, according to the default beam information, beam information of a channel or a reference signal comprised in a set corresponding to the default beam information, wherein the set comprises at least one channel or at least one reference signal, wherein:

different default beam information corresponds to different sets, and manners of dividing the different sets comprise at least one of the following:

a control channel and a service channel respectively belonging to the different sets, respectively;

the different sets respectively comprising different source reference signals of channels or reference signals, respectively; or the same type of channels being divided into the different sets according to different usages.

14. The terminal according to claim 13, wherein the determining at least two pieces of default beam information comprises:

receiving the at least two pieces of default beam information configured by the first TRP or the one or more other TRPs).

15. The terminal according to claim 13, wherein the operations further comprise:

determining updated default beam information; and determining, according to the updated default beam information, the beam information of the channel or the reference signal comprised in the set corresponding to the default beam information.

16. The terminal according to claim 13, wherein the operations further comprise:

determining updated beam information of a first channel or a first reference signal comprised in the set corresponding to the default beam information; and determining, according to the updated beam information of the first channel or the first reference signal, beam information of one or more other channels or one or more other reference signals comprised in the set.

17. The terminal according to claim 13, wherein before the determining, according to the default beam information, beam information of a channel or a reference signal comprised in a set corresponding to the default beam information, the operations further comprise:

receiving first signaling, wherein the first signaling is used for instructing the terminal to use the default beam information; or determining that the channel or the reference signal comprised in the set corresponding to the default beam information is not configured with beam information.

18. A network device, wherein the network device is a Transmitting and Receiving Point (TRP) and comprises: a memory, a processor, and a computer program stored in the memory and executable by the processor, wherein the computer program, when executed by the processor, cause the processor to perform operations comprising:

determining at least two pieces of default beam information according to preset beam information of a first Component Carrier (CC) or a first Bandwidth Part (BWP), wherein in response to determining that the default beam information comprises second default beam information of a first TRP and second default beam information of one or more other TRPs:

preset beam information corresponding to the first TRP comprises: third Transmission Configuration Indication (TCD) state information corresponding to a third codepoint in a TCI field of Downlink Control Information (DCI) sent by the first TRP, and preset beam information corresponding to the one or more other TRPs comprises: other TCI state information corresponding to the third codepoint in the TCI field of the DCI sent by the first TRP, wherein:

the third codepoint corresponds to two or more pieces of TCI state information, the third TCI state information is any one of the two or more pieces of TCI state information, and the other TCI state information is TCI state information other than the third TCI state information of the two or more pieces of TCI state information; and determining, according to the default beam information, beam information of a channel or a reference signal comprised in a set corresponding to the default beam information, wherein the set comprises at least one channel or at least one reference signal, wherein:

different default beam information corresponds to different sets, and manners of dividing the different sets comprise at least one of the following:

a control channel and a service channel respectively belonging to the different sets, respectively;

different sets respectively comprising different source reference signals of channels or reference signals, respectively; or the same type of channels being divided into the different sets according to different usages.

* * * * *